United States Patent Office 3,669,645
Patented June 13, 1972

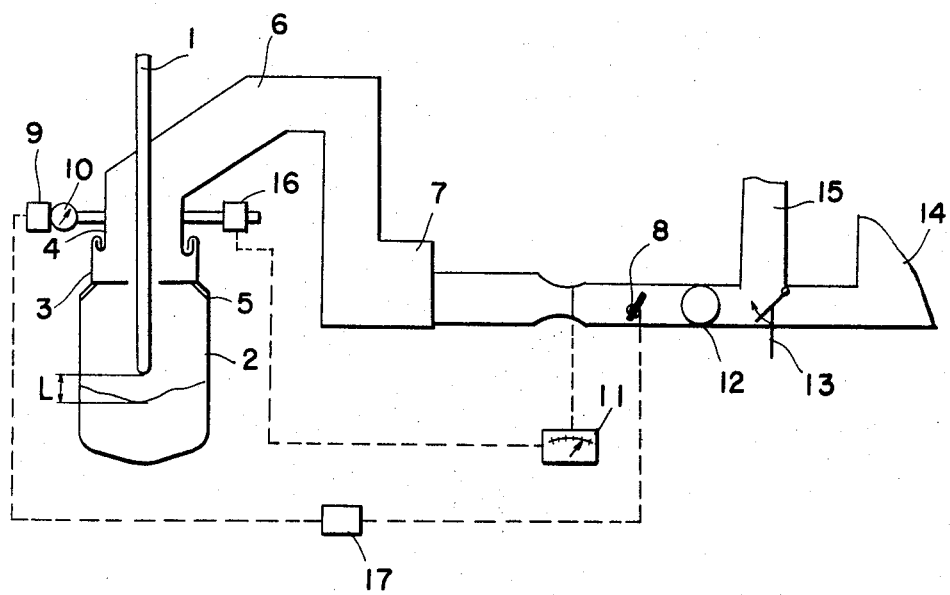

3,669,645
METHOD FOR OPERATING AN OXYGEN TOP-BLOWING CONVERTER
Masashi Oishi, Michihiko Shimada, Yuji Nakayama, Koichiro Naito, and Kazuhiko Okamoto, Kitakyushu, Japan, assignors to Nippon Steel Corporation, Tokyo, Japan
Continuation-in-part of application Ser. No. 640,093, May 22, 1967. This application June 1, 1970, Ser. No. 42,508
Claims priority, application Japan, May 23, 1966, 41/32,830
Int. Cl. C21c 5/32
U.S. Cl. 75—60       2 Claims

ABSTRACT OF THE DISCLOSURE

A method for operating an oxygen top-blowing converter characterized by precisely judging the final carbon content of the steel bath contained in the converter for the manufacture of low-carbon steel by detecting the flow of waste gas generated from the converter at the final stage of oxygen blowing while keeping conditions of operating the converter at constant ones for the same stage of blowing.

---

This application is a continuation-in-part of our copending application Ser. No. 640,093 filed May 22, 1967, and now abandoned.

The present invention relates to a method for operating an oxygen top-blowing converter, more particularly to a method for operating an oxygen top-blowing converter, in which the carbon content in a molten steel is precisely measured by detecting the flow of waste gas generated in the final stage of refining for the manufacture of low-carbon steel, while mounting a hood on the converter mouth closely thereto in the final stage of refining.

Heretofore, during the decarburization reaction of the molten iron in an oxygen top-blowing converter the carbon content thereof has been estimated by observations with naked eye of the state of flame blowing out from the converter mouth. However, it was very difficult to judge the final carbon content in the steel to be obtained by such observations with the naked eye as stated above, because such observations must depend upon long experiences of the operators and even a highly qualified operator has pretty big fluctuations in his judgements.

It is well known among those skilled in the art that recently various attempts have been made of recovering waste gas produced during the refining operations in an unburnt state for the purpose of effectively utilizing the recovered waste gas and has already been practically carried out on an industrial scale.

In the method above-mentioned, it was recognized that the flow of waste gas passing through the gas recovery system and the composition of said gas have close correlations with the carbon content of the steel bath. In view of this fact a proposal was made of finding out the degree of the decarburization by detecting CO or $CO_2$ content in the waste gass, for instance, in U.S. Pat. 3,181,343. That is, the method proposed in the said patent relates to that, in which waste gas discharged from a converter is collected in an unburnt state and an amount of the decarburization is calculated from the carbon content in pig iron charged in the converter by continuously detecting CO or $CO_2$ content in the said waste gas.

In the method above-mentioned, however, not only the control system is complicated, but also there is such a drawback that the method itself would be of no use unless the carbon content in the raw material when charged in the converter is previously known, because the amount of the decarburization calculated must be deducted from the carbon content in the raw material at the charging time. Especially, in the refining process where scrap iron is fed in an amount up to about 30%, it is practically difficult to know the total carbon content of the charge. Moreover, as in the course of refining a good quality of slag is produced, taking away some Fe content and other components transferred thereto, carbon contents in those transferred into the slag must also be taken into consideration for the calculation of the carbon content of the steel bath.

The present invention is to eliminate the above-mentioned drawback and is to provide a method, in which the carbon content in the steel bath can successively be measured by detecting the flow of waste gas at the final stage, while keeping a hood in a practically closed state to the converter mouth at the said stage, irrespective of the composition of the raw material charged.

As a result of experiments it was found out that there occurs scarcely a pulsating phenomenon in the flow of waste gas in a cooler especially at the final stage of refining, and the system of controlling the gas pressure within the cooler is almost out of influences to be exerted by practically closing the hood to the converter mouth, so far it concerns the final stage of refining. From this point of view, the present invention concerns the final stage of refining only and is to provide a method, which is characterized by measuring the carbon content of the steel bath at the final stage of refining by keeping the hood in a practically closed state to the converter mouth at the said stage.

In the system of practically closing the hood there cannot be any gas which may occupy particularly a good proportion in waste gas generated in the refining process other than CO, $CO_2$ and $N_2$. Therefore, the flow of the waste gas can be utilized as a valuable function of the carbon content in the steel bath, and as will be stated later, it has experimentally been confirmed that, when the refining reaches the final stage, there appears a tendency of indicating a definite amount of gas flow corresponding to a certain value of the carbon content, no matter what the composition of the raw material charged may be, and consequently from the above fact a certain reappearing correlative relationship between the flow of the waste gas generated at the final stage of refining and the carbon content in the steel bath can be grasped.

An object of the present invention is to provide a method for operation of an oxygen top-blowing converter which comprises introducing continuously a certain amount of oxygen through a lance into the converter to refine a molten steel contained in the converter, while keeping a hood interlocked with a suction fan in a practically closed state to the converter mouth at the final stage of refining and meanwhile detecting the flow of waste gas generated at the final stage of refining while keeping the gas pressure within a cooler at a constant value and measuring the carbon content in the molten steel from a predetermined correlative relationship between the carbon content in the molten steel and the flow of waste gas obtained from results of previous refining operations conducted under the same blowing conditions and in the same kind of converter.

Another object of the present invention is to provide a method for operation of an oxygen top-blowing converter, wherein a certain amount of inert gas, for instance, $N_2$ gas, is added to the unburnt waste gas collected at the final stage of refining to increase the amount of gas, and the carbon content in the steel bath is measured from the predetermined correlative relationships between the carbon content and the flow of waste gas.

Further objects of the present invention will be elucidated by the following explanation and the attached drawings.

FIG. 3 is a schematic view showing a whole system of recovering an unburned waste gas from an oxygen top-blowing converter.

Figure 1:
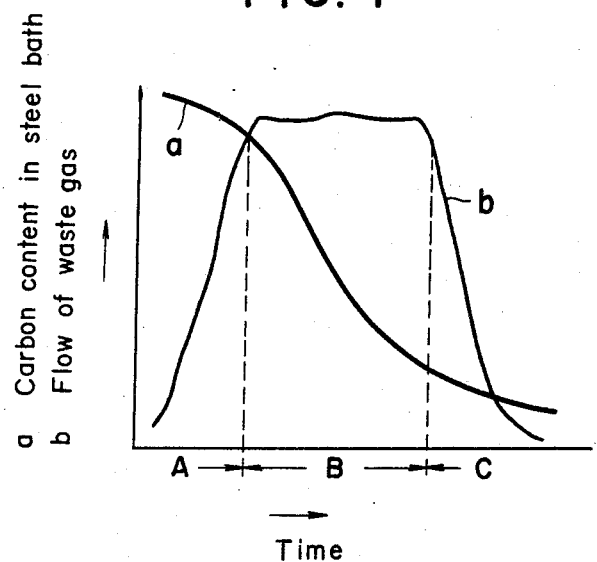
FIG. 1 is a graph showing the relationships between the blowing time and the carbon content of the steel bath and the flow of waste gas.

The following is the concrete explanations in detail of the present invention.

As above-mentioned, it was recognized that the flow of waste gas passing through the gas recovery system and the composition of the gas have close relations with the carbon content of the steel bath. Therefore, a decarburization velocity ($dc/dt$) of a molten bath has been calculated from the waste gas flow and the analysis value of ($CO+CO_2$) of the waste gas in order to measure the carbon content of the molten bath. However, from the view point of the decarburization velocity the whole blowing period of a converter can be divided into three phases, that is, the initial stage (A), the middle stage (B) and the final stage (C) of the blowing. The initial stage of blowing (A) is a stage, at which the decarburization is very low, consequently the amount of waste gas generated at this stage is small, because at this stage there is carried out mainly the desiliconization reaction. Therefore, at this stage the decarburization velocity corresponds mainly to the Si-content of the molten bath. When this stage of blowing out silicon is finished, the amount of waste gas produced is rapidly increased and the initial stage is followed by the middle stage of blowing (B), where the largest amount of waste gas is produced and the decarburization proceeds at its highest. At this stage the decarburization velocity is determined dependently upon an amount of oxygen to be introduced. When the blowing reaches the final stage of blowing (C), the amount of waste gas generated shows a rapidly decreasing tendency. The final stage of blowing (C) is characterized by that the decarburization velocity closely corresponds to the carbon content of the molten bath. Moreover, it is to note that at this final stage of blowing the pulsating phenomenon in the flow of waste gas almost disappears and there is no more trouble to be feared of even when keeping the hood in a state practically closed to the converter mouth. Whether the blowing has reached the final stage can be experimentally known from oxygen of a certain amount having been consumed, because the total amount of oxygen to be consumed for one charge is in general determined and further from the state of the amount of waste gas produced being reduced or from the disappearance of the pulsating phenomenon in the flow of waste gas.

Therefore, if the correlative relationship between the decarburization velocity and the carbon content of a molten bath at the final stage of the blowing is detected from various charges refined under the same blowing conditions in the past, it will be possible to know therefrom the carbon content of the charge of this time to be detected by calculating the decarburization velocity from the waste gas flow and the detected composition of the waste gas. However, also in this case the analysis of the waste gas is inevitably attended with a defect that there is caused an analyzation lag on an account of a distance between the converter mouth and the position of the analyzer, which is usually set behind of the first dust-collector to avoid the high temperature at the converter mouth and further that there occur unavoidable analyzation errors on account of $CO_2$ of a waste gas being absorbed in the said dust collector and the like. These situations hinder the precise measurement of the carbon content of a molten bath. However, the following has been found out by the inventors of the present invention that when a hood is brought in a practically closed state to the converter mouth to maintain the pressure within the hood at a constant one so far as possible, as is characterized by the present invention, an open air to be sucked into the hood is restricted thereby and consequently the corresponding carbon content of the molten bath can be determined by measuring a flow amount of waste gas only, without need of detecting the decarburization velocity, because the analysis value of $CO+CO_2$ changing every moment shows the same pattern of change, whatever the charge may be, so long as the blowing is carried out under the same conditions. Therefore, the term "the final stage of blowing" used in the present invention may be defined as a stage, at which the decarburization velocity corresponds to the carbon content of the molten bath, or more concretely, a period extending from the time, when a decrease in the flow amount of waste gas has started, to the time when the introduction of oxygen is stopped, approximately corresponding to a period after the lapse of two thirds of the whole refining period.

When plotting the points indicating the relations between the carbon content in the steel bath and the flow of waste gas a curve is obtained as is shown in FIG. 1.

In this case, however, it has been further discovered by the inventors of the present invention that the correlative relationship between the waste gas flow and the carbon content of the molten bath can be confirmed at relatively low carobn levels. If the carbon content of the molten bath exceeds 0.7%, there are shown no regular relationship between the waste gas flow and the carbon content. At these high carbon levels, therefore, the method of the present invention cannot practically be applied. The carbon range of the molten bath, in which the method of the present invention can be effectively applied, must be less than 0.7%, preferably less than 0.5%.

The correlative relationship can show various curves, varying according to the different blowing conditions, or further to the particularly converter. Therefore, it is difficult to explain this correlative relationship with a uniform expression. However, if the blowing conditions are once fixed, it is possible to know what pattern the correlative relationship will take. Therefore, if a concrete correlative relationship is prepared by choosing from the charge groups in the past, which were treated under the same blowing conditions as in the present invention, and if the present waste gas flow is measured, the carbon content of the steel bath can be determined by utilizing the said prepared correlative relationship. The "correlative relationship" is prepared by plotting the relationships between the waste gas flow and the carbon content of the steel bath in the final stage of the refining obtained from past results and expressing them linearly, as is shown as a gradually rising curve in FIG. 2. These correlative relationships should be prepared for each converter and for each set of blowing conditions. However, in general, as the blowing conditions of a converter are not so varied, it is not difficult to reproduce past charges. Thus, it is easy to determine the final carbon content of the steel bath by measuring the waste gas flow at the final stage of blowing, provided that certain blowing conditions are satisfied.

Figure 2:
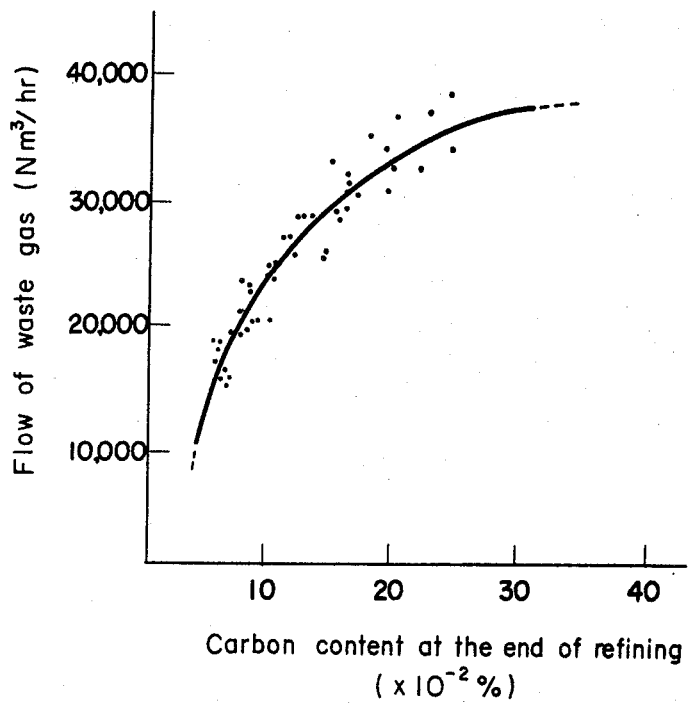
FIG. 2 is a graph showing the relationship between the final carbon content and the flow of waste gas.

The necessary conditions to be satisfied in reference to FIG. 2 (in the case of converter of 170 ton capacity) are as follows:

(1) Gap between the hood and the converter mouth: 0 m./m.
(2) Gas pressure within the cooler: 0 to 3 mm. water column
(3) Distance between the lance and the surface of the steel bath: 1.45 to 1.65 m.
(4) Flow of oxygen: 19,000 to 22,000 Nm.$^3$/hr.
(5) Amount of $N_2$ gas admixed at the later stage of oxygen blowing: 10,000 Nm.$^3$/hr.

In the present invention, as above-mentioned, it is very important to keep the hood in a state practically closed to the converter mouth, introduce oxygen of a certain amount into the converter and to keep the gas pressure within the hood at the final stage of blowing at a constant value in order to prevent the air from infiltrating into the hood or to prevent the converter gas from leaking out so as to be able to grasp the precise refining state.

Further, in order to correctly determine the carbon content in the molten steel, it is also necessary to keep the flow of oxygen and the distance between the lance and the surface of the metal bath constant, whereby the unification of the refining reaction of the molten steel should be secured. In other words, as the consumption ratio of oxygen is a function of the refining reaction, it is not desirable to change the blowing conditions in operating a converter, because it means the fluctuation of the flow of the waste gas.

As to the question, of which is more important, to keep the flow of oxygen at a constant value or to keep the distance between the lance and the surface of the metal bath constant, the former is more important.

As for the gas pressure within the cooler, if the gas pressure is not kept at a fixed value, the air will be sucked in or the waste gas will leak out, which is undesirable because of producing an error in calculation.

When carrying out the practical measurement, however, it is preferable to attain an increase in the flow of the waste gas by jetting inert gas (for example $N_2$) of a certain amount into the hood, because at the final stage of refining the flow of the waste gas will be rapidly diminished.

An increase in the flow of waste gas is more effective on improving the degree of precision of measurement with a flow-meter rather than preventing the fan from being surged.

In this operating method errors in measurements may become large all the more, because measurements of the range covering from the maximum of several ten thousands cubic meters per hour to the minimum of several thousands cubic meters per hour are required. The addition of $N_2$ gas to increase the flow of waste gas is to compensate for the defect as above-mentioned, thereby to make correct measurements of the flow of waste gas.

Thus, by operating the converter in this way as above-mentioned, the carbon content in the steel bath can easily be measured, however, the above stated measurement of the flow of the waste gas is not necessary to be carried out throughout the whole period of oxygen blowing, but is enough if proceeded first when the blowing reached its final stage.

In FIG. 3 showing a schematic view of the whole arrangement of the present invention, oxygen of a certain amount is continuously blown in the converter through a lance 1 with a fixed distance L above the surface of the molten iron charged in the converter 2 to refine the same.

The waste gas generated is sent to a gas holder 14 or stack 15 through a movable hood 3, a fixed hood 4, a gas cooler 6, a dust collector 7, a damper 8 for controlling a gas blow, a flow-meter 11, a suction fan 12 and three way valve 13. 9 is a device for controlling a pressure within the gas cooler, 10 is a pressure detector, 17 is a pressure setting means and 16 is a device for jetting nitrogen for diluting the waste gas. The nitrogen jetting device 16 is arranged so as to be able to jet nitrogen at any time during the whole period of blowing, but is practically used only at the final stage of blowing, when the flow of the waste gas is rapidly decreased, for the purpose of diluting the waste gas to increase the amount of gas. The jetting of nitrogen may be commenced when the flow of the waste gas has passed its peak.

The movable hood 3 forms a closed state at a position of mounting the hood on the converter mouth part when it is lowered. That is, the lower end of the movable hood 3 may be so closely placed on the converter mouth part as to substantially intercept the communication of the inside gas generated from the converter with the surrounding air. If the movable hood 3 is lowered onto the converter mouth part so that the whole weight of the hood is loaded on the converter, the lower shielding surface 5 of the movable hood is brought into a closed contact with the surface of the converter mouth part, thereby a practically desired closed state is secured. However, during the blowing process base metal and slag splash out and cling on the converter mouth part, whereby a gap is often formed between the lower end of the movable hood and the converter mouth part. Therefore, it is desirable to remove the clung metal and slag each charge to secure the desired closed state.

The pressure within the cooler in the waste gas recovering system is to be set by means of the pressure setting device 17 at a positive pressure of about 0 to 3 mm. water column, which can be easily attained by interlocking the pressure control device 9 and control damper 8 with the automatic control system. However, it is needless to say that the present invention is not limited to the method of operating a converter with low positive pressure as above-mentioned.

Thus, the flow of the waste gas or the resultant flow of the waste gas and $N_2$ added is detected at final stage of refining, and on the basis of the value thus detected, the blowing is stopped in accordance with the correlation pre-determined between the flow of the waste gas and carbon content in the steel bath.

The invention will be explained by the following examples in reference to the curve shown in FIG. 2:

EXAMPLE 1

Amount of molten iron: 129.7 ton
Components of molten iron by weight percent:
C _____ 4.41
Si _____ 0.5
Mn _____ 0.57
P _____ 0.158
S _____ 0.03

Distance between the lance and surface of steel bath: 145 m.
Amount of oxygen: 19,000 Nm.$^3$/hr.
Inner pressure within the cooler: +2 mm. water column
Amount of $N_2$ added for dilution at the later stage: 10,000 Nm.$^3$/hr.
Target flow of waste gas: 17,000 Nm.$^3$/hr.
Target carbon content at the finishing time: 0.06%
Flow of waste gas at the finishing time: 16,000 Nm.$^3$/hr.
Analysis by weight percent:
C _____ 0.063
Si _____ ([1])
Mn _____ 0.09
P _____ 0.008
S _____ 0.02

[1] Not analyzed.

EXAMPLE 2

Amount of molten iron: 137.0 ton
Components of molten iron by weight percent:
C _____ 4.35
Si _____ 0.49
Mn _____ 0.59
P _____ 0.167
S _____ 0.032

Distance between the lance and the surface of steel bath: 1.45 m.
Flow of oxygen: 19,000 Nm.$^3$/hr.
Inner pressure of the cooler: +2 mm. water column
Amount of $N_2$ added for dilution at the later stage: 10,000 Nm.$^3$/hr.

Target flow of waste gas: 30,000 Nm.³/hr.
Target carbon content at the finishing time: 0.155%
Flow rate of waste gas at the finishing time: 29,000 Nm.³/hr.
Analysis by weight percent:

| | |
|---|---|
| C | 0.151 |
| Si | (¹) |
| Mn | 0.68 |
| P | 0.016 |
| S | 0.02 |

¹ Not analyzed.

As is evidently seen from these examples, the judgements of the carbon content are very accurate, and important by the carbon content at the finishing time can precisely be judged even when the carbon content in the charged raw material is unknown. It is also possible to apply a computer or an automatic control system to the operating method of the present invention as abovementioned.

What is claimed is:

1. A method for operating an oxygen top-blowing converter for the manufacture of low-carbon steel which comprises introducing continuously a predetermined amount of oxygen through a lance into said converter to refine a molten steel contained in said converter, keeping a hood interlocked with a suction fan in a practically closed state to the mouth of said converter during the final stage of refining of said molten steel, maintaining the gas pressure within a cooler of said converter at a constant value, detecting the flow of waste gas generated at said final stage of said refining, and measuring the carbon content in said refined molten steel containing less than 0.7% carbon from a predetermined correlative relationship between the carbon content in the molten steel and the flow of waste gas obtained from results of previous refining operations conducted under the same conditions and in the same converter.

2. A method for operating an oxygen top-blowing converter for the manufacture of low carbon steel which comprises introducing continuously a predetermined amount of oxygen through a lance into said converter to refine a molten steel contained in said converter, keeping a hood interlocked with a suction fan in a practically closed state to the mouth of said converter during the final stage of refining of said molten steel, injecting inert gas of a predetermined amount into the waste gas generated by said refining to increase the amount of gas when the flow of the waste gas generated becomes below said predetermined amount, maintaining the pressure within a cooler of said converter at a constant value, detecting the amount of gas formed by adding said inert gas to said waste gas, and measuring the carbon content in said refined molten steel containing less than 0.7% carbon from a predetermined correlative relationship between the carbon content in a molten steel and the flow of waste gas obtained from results of previous refining operations conducted under the same conditions and the same converter.

References Cited
UNITED STATES PATENTS

| | | | |
|---|---|---|---|
| 3,181,343 | 5/1965 | Fillon | 75—60 X |
| 3,220,826 | 11/1965 | Okanina et al. | 75—60 |
| 3,329,495 | 7/1967 | Ohta et al. | 75—60 |
| 3,372,023 | 3/1968 | Krainer et al. | 75—60 |
| 3,463,631 | 8/1969 | Vayssiere et al. | 75—60 |

L. DEWAYNE RUTLEDGE, Primary Examiner

G. K. WHITE, Assistant Examiner